United States Patent
Iwasawa et al.

(10) Patent No.: US 11,218,631 B2
(45) Date of Patent: Jan. 4, 2022

(54) IMAGE-CAPTURING SYSTEM CAPABLE OF REDUCING AN AMOUNT OF DATA RELATED TO IMAGE ACQUISITION

(71) Applicant: TAMRON CO., LTD., Saitama (JP)

(72) Inventors: Yoshito Iwasawa, Saitama (JP); Yasuhiko Obikane, Saitama (JP); Hisashi Kitano, Saitama (JP); Yuri Koyama, Saitama (JP); Yuichi Imamiya, Saitama (JP)

(73) Assignee: TAMRON CO., LTD., Saitama (JP)

( * ) Notice: Subject to any disclaimer, the term of this patent is extended or adjusted under 35 U.S.C. 154(b) by 0 days.

(21) Appl. No.: 17/049,454

(22) PCT Filed: Aug. 21, 2019

(86) PCT No.: PCT/JP2019/032661
§ 371 (c)(1),
(2) Date: Oct. 21, 2020

(87) PCT Pub. No.: WO2020/040206
PCT Pub. Date: Feb. 27, 2020

(65) Prior Publication Data
US 2021/0266457 A1    Aug. 26, 2021

(30) Foreign Application Priority Data

Aug. 23, 2018  (JP) .............................. JP2018-156408

(51) Int. Cl.
*H04N 5/232* (2006.01)
*G02B 9/64* (2006.01)
(52) U.S. Cl.
CPC ........... *H04N 5/23232* (2013.01); *G02B 9/64* (2013.01)
(58) Field of Classification Search
CPC .............................. H04N 5/23232; G02B 9/64
See application file for complete search history.

(56) References Cited

U.S. PATENT DOCUMENTS

2004/0141633 A1*  7/2004  Horie .................... H04N 7/183
                                                   382/103
2013/0329091 A1*  12/2013  Sato .................... H04N 5/3572
                                                   348/240.99
(Continued)

FOREIGN PATENT DOCUMENTS

JP       H11-234652 A     8/1999

OTHER PUBLICATIONS

Oct. 21, 2019, International Search Report issued for related PCT Application No. PCT/JP2019/032661.

(Continued)

*Primary Examiner* — Padma Haliyur
(74) *Attorney, Agent, or Firm* — Paratus Law Group, PLLC (57) ABSTRACT

To provide an image-capturing system capable of maintaining high analysis accuracy while reducing the amount of data related to image acquisition with a simple method. In order to achieve the object, the image-capturing system includes an image-capturing device configured to acquire image data of a subject, and an image-capturing control device configured to control image acquisition by the image-capturing device. The image-capturing control device includes a difference extraction means configured to extract difference data on the basis of any two image data items acquired by the image-capturing device, a change amount extraction means configured to extract change amount data on the basis of any two difference data items extracted by the difference extraction means, and a condition change means configured to change an image acquisition condition in the image-capturing device on the basis of the change amount data extracted by the change amount extraction means.

17 Claims, 7 Drawing Sheets

(56) References Cited

U.S. PATENT DOCUMENTS

| | | | |
|---|---|---|---|
| 2016/0127616 A1* | 5/2016 | Seshadrinathan | H04N 5/23229 348/241 |
| 2018/0007321 A1* | 1/2018 | Brady | H04N 1/00209 |
| 2018/0130190 A1* | 5/2018 | Patriarche | G06T 5/008 |

OTHER PUBLICATIONS

Oct. 21, 2019, International Search Opinion issued for related PCT Application No. PCT/JP2019/032661.

* cited by examiner

IMAGE-CAPTURING SYSTEM CAPABLE OF REDUCING AN AMOUNT OF DATA RELATED TO IMAGE ACQUISITION

CROSS REFERENCE TO PRIOR APPLICATION

This application is a National Stage Patent Application of PCT International Patent Application No. PCT/JP2019/032661 (filed on Aug. 21, 2019) under 35 U.S.C. § 371, which claims priority to Japanese Patent Application No. 2018-156408 (filed on Aug. 23, 2018), which are all hereby incorporated by reference in their entirety.

TECHNICAL FIELD

The present invention relates to an image-capturing system that acquires an image.

BACKGROUND ART

Surveillance cameras have been conventionally used as means for monitoring any areas. Typically, image data acquired by an image-capturing device, such as a surveillance camera, is transmitted to a control center or the like via communication means. An image captured by a surveillance camera of late has a large number of pixels and high resolution, and thus has a problem of low communication speed due to an increase in the amount of data. Thus, in order to transmit and receive image data while maintaining high communication speed, it is necessary to acquire image data while giving priority to a case where an object to be monitored has moved.

A conventional method for detecting the movement of an object to be monitored acquires an image every time a certain period elapses, and extracts desired data from the image to detect the movement. In this case, detection of the movement of the object to be monitored using only a change at a monitoring point may erroneously determine that there is a change in spite of the fact that there is actually no change in the object to be monitored due to a change in the solar radiation condition or the presence or absence of illumination. Thus, in order to prevent a reduction in the accuracy of the movement detection caused by the erroneous determination, for example, a movement detection device described in Patent Literature 1 has been developed.

In the movement detection device of Patent Literature 1, a monitoring screen is provided with a first monitoring point where the movement of an object to be monitored is detected, and a second monitoring point which is not affected by the movement of the object to be monitored. When there is a change at the first monitoring point and there is no change at the second monitoring point, it is determined that there is a change in the object to be monitored.

CITATION LIST

Patent Literature

Patent Literature 1: JP H11-234652 A

SUMMARY OF THE INVENTION

Problems to be Solved by the Invention

In the movement detection device disclosed in Patent Literature 1, the two monitoring points are set, and the movement detection is performed in such a manner that a change at any one of the two monitoring points is detected as a change in the object to be monitored except an environmental change. Thus, it is necessary to set monitoring points according to the installation place of a camera, which results in a problem of a complicated operation.

Further, even when a change at one of the two monitoring point is a slight change that falls within the margin of error, the object to be monitored is determined to have changed. Thus, the reliability is reduced, and an analysis with high accuracy cannot be performed.

As can be understood from the above description, it is an object of the present invention to provide an image-capturing system capable of maintaining high analysis accuracy while reducing the amount of data related to image acquisition with a simple method.

Solutions to Problems

Thus, as a result of earnest studies, the inventors of the present invention have conceived the following invention to solve the above problems.

Specifically, an image-capturing system according to the present invention includes an image-capturing device configured to acquire image data of a subject, and an image-capturing control device configured to control image acquisition by the image-capturing device. The image-capturing control device includes a difference extraction means configured to extract difference data on the basis of any two image data items acquired by the image-capturing device, a change amount extraction means configured to extract change amount data on the basis of any two difference data items extracted by the difference extraction means, and a condition change means configured to change an image acquisition condition in the image-capturing device on the basis of the change amount data extracted by the change amount extraction means.

Effects of the Invention

The image-capturing system according to the present invention is capable of acquiring an image that enables high analysis accuracy to be maintained while reducing the amount of data related to the image acquisition with a simple method.

DESCRIPTION OF EMBODIMENTS

Hereinbelow, an embodiment of an image-capturing system according to the present application will be described. Note that the image-capturing system described below is one aspect of the present application, and the present invention is not limited to the aspect described below.

Figure 1:
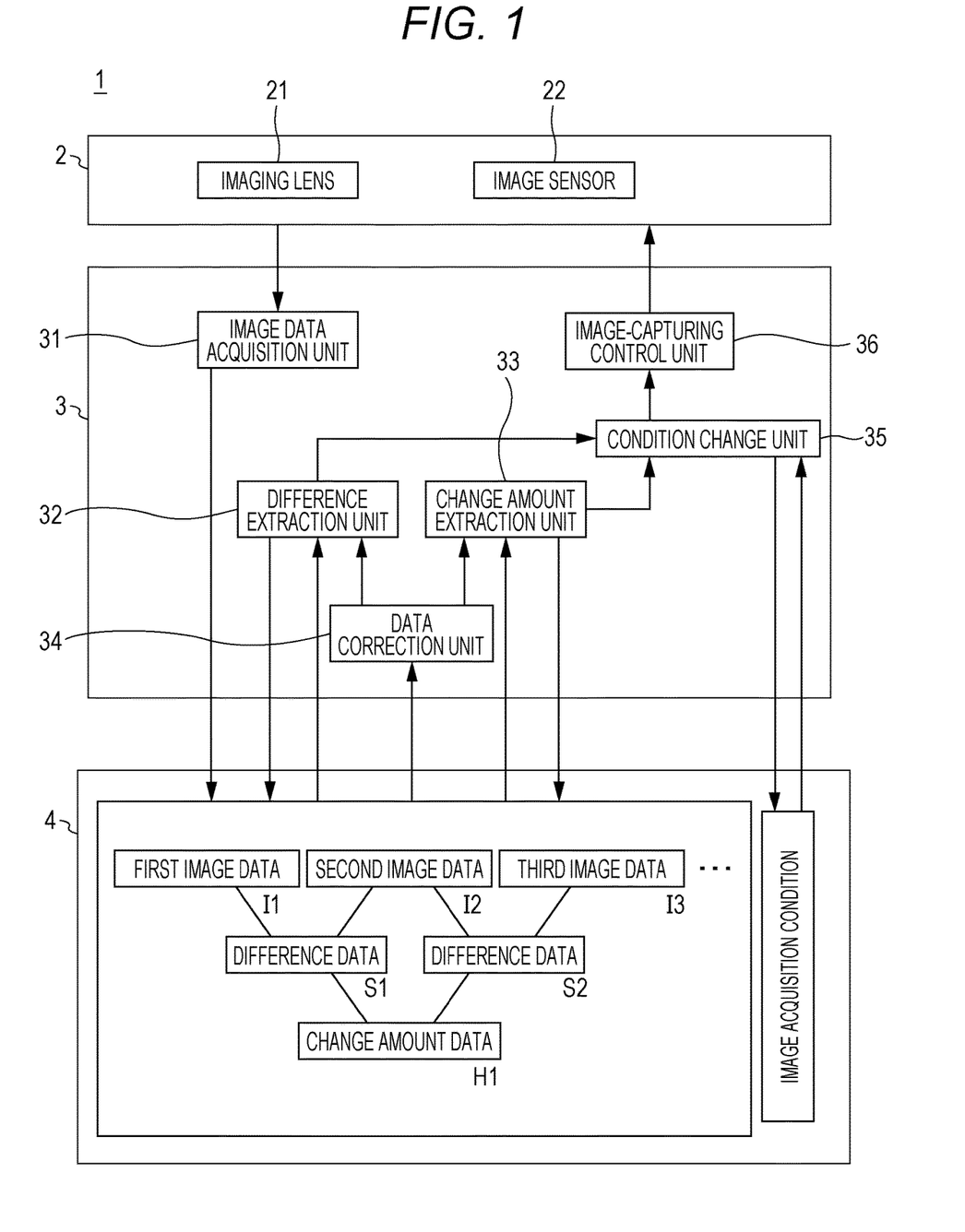
FIG. 1 is a block diagram illustrating the schematic configuration of an image-capturing system according to the present invention.

As illustrated in FIG. 1, an image-capturing system 1 according to the present application includes an image-capturing device 2, which acquires image data of a subject, an image-capturing control device 3, which controls image acquisition by the image-capturing device 2, and a storage unit 4, which stores the image data acquired by the image-capturing device 2. The present application is characterized in that the image-capturing control device 3 includes a difference extraction unit 32, which extracts difference data on the basis of any two image data items acquired by the image-capturing device 2, a change amount extraction unit 33, which extracts change amount data on the basis of any two difference data items extracted by the difference extraction unit 32, and a condition change unit 35, which changes an image acquisition condition in the image-capturing device 2 on the basis of the change amount data extracted by the change amount extraction unit 33.

The image-capturing system 1 according to the present application changes the next image acquisition condition in the image-capturing device 2 on the basis of change amount data which has been extracted on the basis of two difference data items. Accordingly, the image-capturing system 1 is capable of determining a change in a moving object present in a subject area of the image-capturing device 2 with high accuracy, thereby acquiring an image with high analysis accuracy maintained while reducing the amount of data related to the image acquisition. The present application is characterized particularly in the image-capturing control device 3. Thus, in the following description, the image-capturing control device 3 is described first, and the image-capturing device 2 is then described.

1. Image-Capturing Control Device

As illustrated in FIG. 1, the image-capturing control device 3 includes an image data acquisition unit (image data acquisition means) 31, the difference extraction unit (difference extraction means) 32, the change amount extraction unit (change amount extraction means) 33, a data correction unit (data correction means) 34, the condition change unit (condition change means) 35, and an image-capturing control unit (image-capturing control means) 36. The image-capturing control device 3 is, for example, provided with a CPU, and capable of implementing each function by executing a predetermined program. Further, the image-capturing control device 3 is communicably connected to the image-capturing device 2 and the storage unit 4 via predetermined communication means (not illustrated). The communication means employed herein is not particularly limited to any communication means, and may be wired or wireless communication means. Hereinbelow, each unit will be described.

1-1. Image Data Acquisition Unit

The image data acquisition unit 31 acquires image data transmitted from the image-capturing device 2 as needed. The image data acquisition unit 31 transmits the acquired image data to the storage unit 4 as needed. Thus, image data transmitted from the image data acquisition unit 31 are sequentially stored in the storage unit 4.

1-2. Difference Extraction Unit

The difference extraction unit 32 extracts difference data on the basis of any two image data items acquired by the image-capturing device 2. Specifically, the difference extraction unit 32 extracts any two image data items from a plurality of image data items which have been sequentially stored in the storage unit 4 from the image data acquisition unit 31. The difference extraction unit 32 extracts one of the two image data items that is captured before the other one as first image data and the other image data item that is captured after the first image data as second image data. The first image data and the second image data are preferable, but not particularly limited to, image data items that are consecutively captured (acquired). In other words, the second image data is not necessarily image data that is acquired immediately after the first image data, and it is only required that the second image data be acquired after the first image data.

Figure 2:
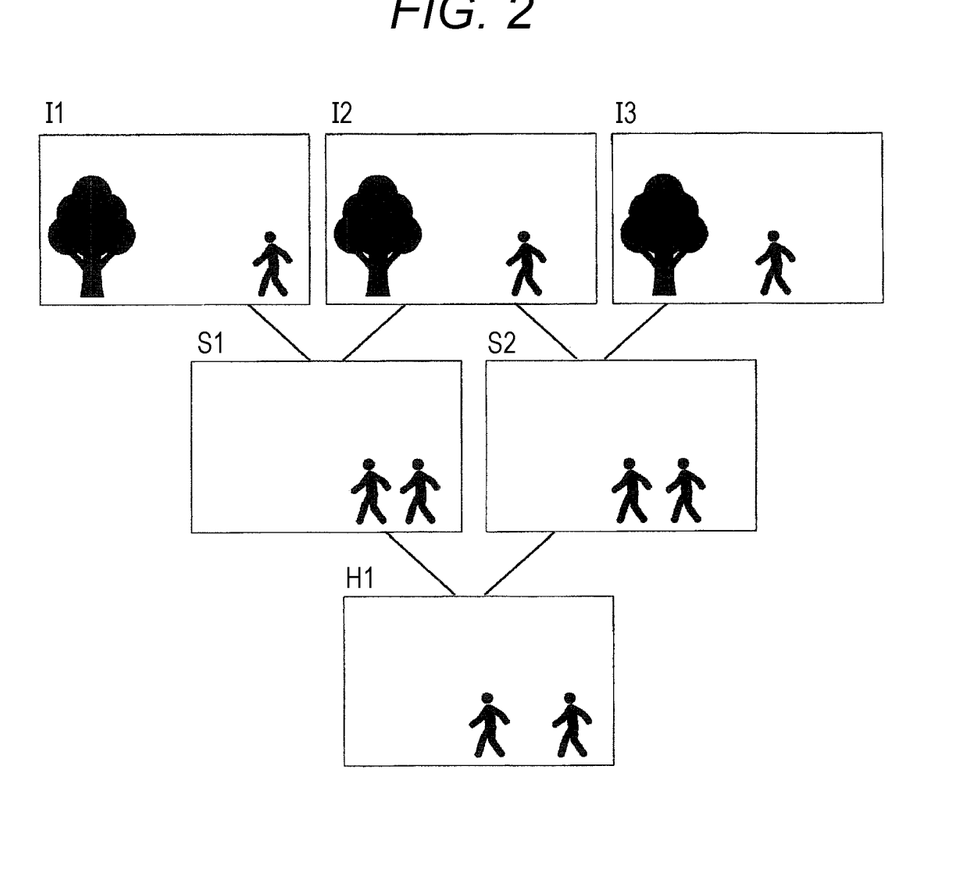
FIG. 2 is an image diagram relating to extraction of difference data and change amount data.

The difference extraction unit 32 performs a comparison between the extracted first image data and the extracted second image data to extract difference data. The difference data is data indicating the difference between the two compared image data items, and a data format thereof is not particularly limited to any format. For example, as illustrated in FIG. 2, the difference extraction unit 32 performs a comparison between first image data I1 and second image data I2, and performs arithmetic processing for extracting only a changed pixel to acquire difference data S1. At this time, the difference extraction unit 32 preferably performs the extraction of the difference data on the basis of at least either the number of pixels or the ratio of pixels different between the two image data items. Specifically, when, between the first image data I1 and the second image data I2, a changed pixel is defined as 1 and an unchanged pixel is defined as 0 to calculate the difference data S1, it is possible to determine whether movement within the image is large on the basis of the number of pixels with a flag of 1. At this time, the magnitude of movement within the image may be determined on the basis of the ratio of the number of changed pixels to the number of pixels in the entire image. In a case where the image-capturing device 2 is a fixed-point camera which is installed in a fixed manner at a predetermined position, a change in the entire image is often small, and the calculation of the image change using difference data as performed in the present invention is thus particularly effective in reducing the amount of data.

Figure 3:
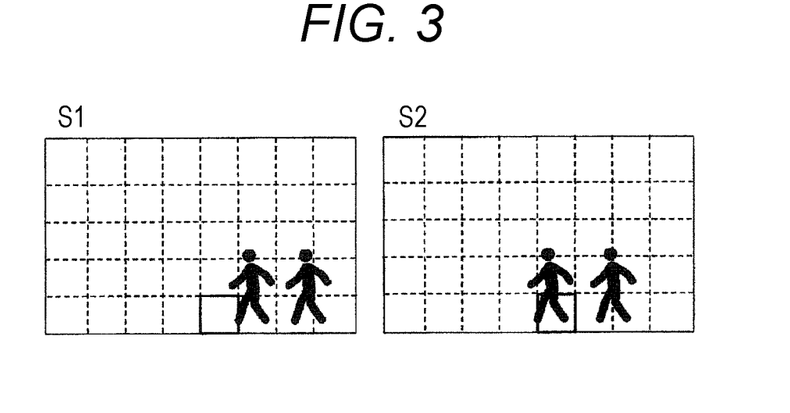
FIG. 3 is an image diagram relating to extraction of local difference data.

Further, as illustrated in FIG. 3, the difference extraction unit 32 preferably divides the whole of each of the two extracted image data items into a plurality of blocks (hereinbelow, also referred to as "local blocks"), and extracts local difference data for each of the local blocks. In the extraction of the local difference data, the difference extraction unit 32 divides the whole of each of the two extracted image data items into local blocks, and compares specific local blocks having corresponding positional information in the two image data items to extract the local difference data. The specific local block can be set in any manner, and the number of specific local blocks may be one or more. When the difference data extracted by the difference extraction unit 32 is the local difference data extracted for each local block in this manner, it is possible to estimate a moving direction and a moving speed of a moving object with high accuracy and more precisely change the "image acquisition condition in the image-capturing device", which will be described below.

The difference data or the local difference data extracted by the difference extraction unit 32 described above are sequentially transmitted to the storage unit 4 and stored in the storage unit 4. At this time, the image data stored in the storage unit 4 preferably includes information of a time when the image is captured because of the following reason. When each of any two image data items extracted by the difference extraction unit 32 includes information of a time when the image is captured, the difference extraction unit 32 can perform a comparison between the information of the time when the first image data is captured and the information of the time when the second image data is captured to calculate an acquisition interval between the time point when the first image data is captured and the time point when the second image data is captured. Although an example in which the image data includes the information of the time when the image is captured is described herein, alternatively, the acquisition interval between the first image data and the second image data may be calculated from information related to a frame rate when the image is captured. When the acquisition interval between the first image data and the second image data can be calculated at the time of extracting the difference data, it is possible to change the "image acquisition condition in the image-capturing device", which will be described in detail below, with high accuracy.

1-3. Change Amount Extraction Unit

The change amount extraction unit 33 extracts change amount data on the basis of any two difference data items extracted by the difference extraction unit 32, and sequentially transmits the extracted change amount data to the storage unit 4 to store the change amount data in the storage unit 4. Specifically, the change amount extraction unit 33 extracts any two difference data items from a plurality of difference data items which have been sequentially stored in the storage unit 4 from the difference extraction unit 32. The change amount extraction unit 33 extracts one of the two difference data items that is extracted from image data captured before the other image data as first difference data and the other difference data that is extracted from image data captured after the image data used in the extraction of the first difference data as second difference data. The first difference data and the second difference data are preferably, but not particularly limited to, difference data items extracted from the image data items that are consecutively captured (acquired). In other words, the second difference data is not necessarily difference data that is extracted using image data acquired immediately after the image data used in the extraction of the first difference data, and it is only required that the second difference data be difference data that is extracted using image data acquired after the first image data. However, it is preferable to extract the change amount data using difference data items that are extracted from image data items consecutively captured because an optimum image acquisition condition can be set.

The change amount extraction unit 33 performs a comparison between the extracted first difference data and the extracted second difference data to extract change amount data. The change amount data is data indicating the difference (change amount) between the two compared difference data items, that is, a change amount of any one of the difference data items with respect to the other difference data item, and a data format thereof is not particularly limited to any format. Specifically, the change amount extraction unit 33 performs a comparison between the first difference data S1 and the second difference data S2, and performs arithmetic processing for extracting only a changed pixel to acquire change amount data H1. At this time, the change amount extraction unit 33 preferably performs the extraction of the change amount data on the basis of at least either the number of pixels or the ratio of pixels different between the two difference data items as with the difference extraction unit 32.

For example, the change amount data H1 illustrated in FIG. 2 is acquired from the first difference data S1 and the second difference data S2 which are extracted on the basis of image data I1, image data I2, and image data I3 obtained by consecutively capturing a state in which a person moves within the subject area of the image-capturing device 2 at a predetermined frame rate. As illustrated in FIG. 2, the difference between the first difference data S1 and the second difference data S2 is only person image data of the image data I1 and person image data of the image data I3, and the number of changed pixels is hardly changed compared to the first difference data S1 and the second difference data S2. Thus, the change amount data H1 extracted by the change amount extraction unit 33 in the case of FIG. 2 has a small value.

Figure 4:
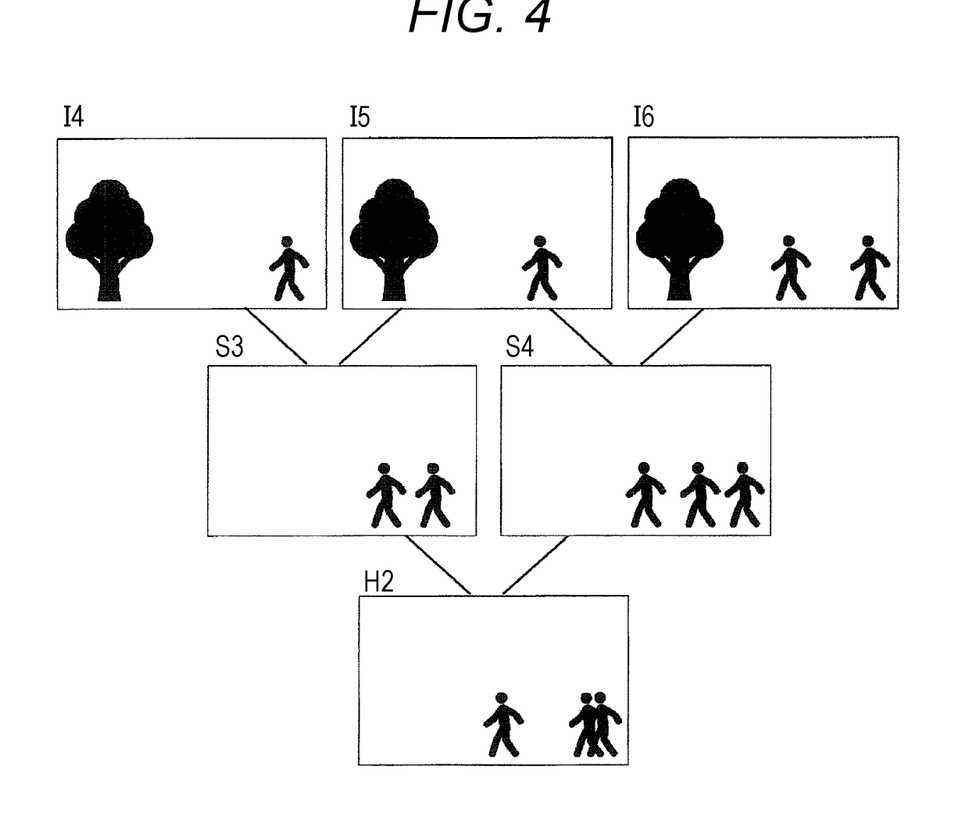
FIG. 4 is an image diagram relating to extraction of difference data and change amount data.

On the other hand, change amount data H2 illustrated in FIG. 4 is acquired from first difference data S3 and second difference data S4 which are extracted on the basis of image data I4, image data I5, and image data I6 obtained by consecutively capturing, in addition to a state in which a person moves within the subject area of the image-capturing device 2, a state in which another person enters the subject area at a predetermined frame rate. As illustrated in FIG. 4, the difference between the first difference data S3 and the second difference data S4 is person image data that first appears in the image data I6 in addition to person image data of the image data I4 and person image data of the image data I6, and the number of changed pixels is increased compared to the first difference data S3 and the second difference data S4. Thus, the change amount data H2 of FIG. 4 has a larger change amount than the change amount data H1 of FIG. 2.

As illustrated in FIG. 2, even when the data amount of the first difference data S1 and the second difference data S2 is large, the data amount of the change amount data H1, which is the difference between the first difference data S1 and the second difference data S2, may not be different from that of the difference data. In this case, even when a moving object is present in the subject area of the image-capturing device 2, it can be determined that there is no change in the moving speed and the amount of the moving object. In this case, it is possible to maintain the current image acquisition condition without changing the image acquisition condition in the image-capturing device 2.

On the other hand, as illustrated in FIG. 4, when the data amount of the first difference data S3 and the second difference data S4 is large, and the data amount of the change amount data H2, which is the difference between the first difference data S3 and the second difference data S4, becomes larger than that of the difference data, it can be determined that a moving object is present in the subject area of the image-capturing device 2 and the change amount of the moving object is large. In this case, the image acquisition condition in the image-capturing device 2 can be changed to a condition with higher accuracy.

Although the present embodiment describes an example in which the image acquisition condition is changed using the data amount of the change amount data and the data amount of the difference data, the present application is not limited thereto. For example, when the change amount data H2 illustrated in FIG. 4 is extracted after the change amount data H1 illustrated in FIG. 2, since the data amount of the change amount data H2 is larger than the data amount of the change amount data H1, it can be determined that the change amount of the moving object is large. In this case, the image acquisition condition in the image-capturing device 2 may be changed to a condition with higher accuracy. In this manner, two change amount data items can also be used in the image acquisition condition change process.

Further, the change amount extraction unit 33 preferably extracts the change amount data on the basis of the local difference data described above. When the change amount data is extracted on the basis of the local difference data, the change amount extraction unit 33 extracts any two local difference data items having the corresponding positional information in the image data items from the storage unit 4. For example, FIG. 3 illustrates an image in which the whole image of each of the first difference data S1 and the second difference data S2 is divided into a plurality of local blocks. In FIG. 3, two local difference data items having the corresponding positional information at any positions in the first difference data S1 and the second difference data S2 are highlighted with a thick line. When focusing on the highlighted local difference data items in FIG. 3, it can be understood that the data amount of the local difference data of the second difference data S2, which is extracted after the first difference data S1, is larger than the data amount of the local difference data of the first difference data S1. In other words, the change amount of the second local difference data relative to the first local difference data (local change amount data) is large. On the other hand, for example, when the upper left local difference data items of the respective difference data items are compared with each other, the local change amount is small. In this manner, it is possible to perform estimation of the moving direction and the moving speed of the moving object with higher accuracy by using the local difference data. Thus, the change amount data (local change amount data) can be extracted with high accuracy on the basis of the local difference data, which enables more precise setting of the image acquisition condition. Note that details of setting change control of the "image acquisition condition in the image-capturing device" based on the change amount data extracted by the change amount extraction unit 33 will be described below.

1-4. Data Correction Unit

The image-capturing system 1 according to the present application preferably includes a data correction unit 34, which performs error correction on the difference data described above. The error correction performed by the data correction unit 34 includes a case where the difference data is divided into local blocks, and a slight change caused by an environmental change is adjusted, and a case where distortion derived from the image-capturing device 2 is adjusted. Although the present embodiment describes the case where the error correction is performed on the difference data, the present application is not limited thereto. The present application may be applied to a case where error correction is performed on the change amount data, or error correction may be performed on both the difference data and the change amount data.

1-4-1. Error Correction Using Local Block

Typically, in a case where the image-capturing device 2 is fixed at a fixed point, image data of a subject may include a fixed object. Examples of the fixed object include a tree as illustrated in FIG. 2 and a building. The amount of light in these fixed objects may be slightly changed when leaves of the tree sway in the wind or due to a solar radiation condition. A change in the image data caused by the environmental change in the fixed objects falls within the margin of error. Thus, sensitively changing the image acquisition condition reduces reliability and disables an analysis with high accuracy.

Thus, the data correction unit 34 may divide the whole of the difference data into a plurality of local blocks, and correct the difference data assuming that there is no change when the changed data amount falls within a predetermined error amount for each of the local blocks. In this case, the data correction unit 34 previously sets an error amount for each local block. The error amount may be set as a predetermined threshold or a range having an upper limit and a lower limit. A precise image acquisition condition can be set using difference data with higher accuracy by correcting the data amount of difference data for each local block on the basis of the error amount.

Figure 5:
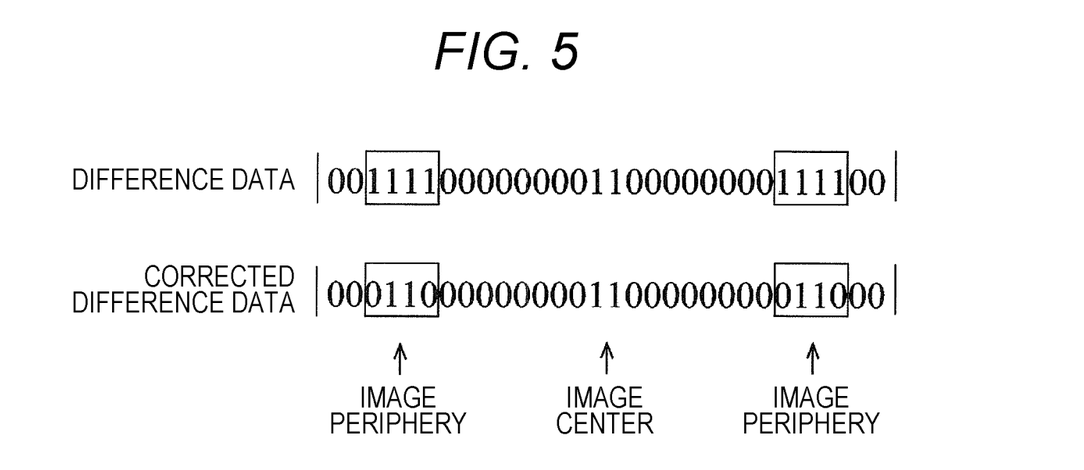
FIG. 5 is a diagram illustrating an image of adjustment of distortion derived from a lens.

1-4-2. Error Correction by Adjustment of Distortion Derived from Image-capturing Device Typically, image data of a three-dimensional image acquired by an image-capturing device using a lens having a wide angle of view has a larger distortion in the peripheral region than the central region due to a perspective effect. Thus, the data correction unit 34 corrects the difference data amount in the peripheral region of the image data on the basis of the characteristics of an imaging lens 21, which is attached to the image-capturing device 2 included in the image-capturing system 1. As an example, FIG. 5 illustrates an image of difference data having pixels arranged in a predetermined horizontal direction before correction and an image after the correction. In FIG. 5, first pixel data and second pixel data are compared with each other, and a changed pixel is indicated as 1 and an unchanged pixel is indicated as 0. In the pixel data before the correction, pixel data items of "1111" are arranged in the image peripheral part surrounded by a square. For these pixel data items, the data correction unit 34 assumes that the image peripheral part has distortion based on the characteristics of the imaging lens 21, and corrects "1111" in the image peripheral part to "0110" to adjust the difference data assuming that there is no pixel change caused by distortion.

Accordingly, it is possible to adjust the distortion in the image peripheral part of the image according to the characteristics of the imaging lens 21 attached to the image-capturing device 2. Thus, it is possible to set a precise image acquisition condition using difference data with higher accuracy.

1-5. Condition Change Unit

The condition change unit 35 sets the image acquisition condition in the image-capturing device 2 by the image-capturing control unit 36 on the basis of the change amount data extracted by the change amount extraction unit 33. Here, the image acquisition condition is, for example, at least one of an acquisition interval, the number of pixels, a resolution, a color tone (gray scale), and a size, of images. Specifically, the image acquisition interval indicates a period from a time point when the image-capturing device 2 acquires image data last time to a time point when the image-capturing device 2 acquires next image data.

Further, the image acquisition condition in the present invention is not limited to a condition related to capturing of an image in the image-capturing device 2. For example, the image acquisition condition may be a condition of storing an image acquired by the image-capturing device 2 in the storage unit 4 by the image data acquisition unit 31. In this case, the image acquisition condition is, for example, at least one of a storage interval with respect to the storage unit 4 (image acquisition interval), the number of pixels, the resolution, the color tone (gray scale), and the size, of images. As an example, the condition change unit 35 changes the image acquisition condition by changing the storage interval with respect to the storage unit 4 instead of the image acquisition interval in the image-capturing device 2. This also enables the condition change unit 35 to reduce the capacity of images stored in the storage unit 4 by increasing (extending) the image storage interval with respect to the storage unit 4 without changing the image capturing interval in the image-capturing device 2. Thus, it is possible to reduce the amount of data related to image acquisition with a simple method.

Data related to the image acquisition condition is previously stored in the storage unit 4. The condition change unit 35 performs a comparison between the data related to the image acquisition condition stored in the storage unit 4, for example, threshold data and the change amount data acquired by the change amount extraction unit 33 and changes the next image acquisition condition in the image-capturing device 2. As described above, the next image acquisition condition can be changed on the basis of the change amount of a moving object present in the subject area of the image-capturing device 2 by using the change amount data acquired by the change amount extraction unit 33. Thus, it is possible to obtain monitoring image data of the moving object with high accuracy while reducing the amount of data related to image acquisition. Further, the condition change unit 35 also preferably changes the next image acquisition condition in the image-capturing device 2 on the basis of not only the change amount data, but also the difference data extracted by the difference extraction unit 32 in addition to the change amount data. Note that specific setting change control of the "image acquisition condition in the image-capturing device" based on the change amount data will be described below.

1-6. Image-Capturing Control Unit

The image-capturing control unit 36 controls the image-capturing device 2 in accordance with the image acquisition condition input from the condition change unit 35 described above to perform the next subject image data acquisition.

2. Storage Unit

The storage unit 4 includes a ROM which is a nonvolatile memory, and a RAM which is a volatile memory. The storage unit 4 is communicably connected to the image-capturing control device 3 described above via communication means to enable transmission and reception of image data and various control signals. The communication means employed herein is not particularly limited to any control means, and may be wired or wireless control means.

The storage unit 4 stores various data items including image data received from the image-capturing control device 3 via the communication means. Further, the storage unit 4 stores various data items related to the image acquisition condition which are used in the change of the image acquisition condition by the condition change unit 35.

Note that, although the storage unit 4 is provided separately from the image-capturing control device 3 in the present embodiment, the present application is not limited thereto. The storage unit 4 may be incorporated in the image-capturing control device 3.

3. Image-Capturing Device

Next, the image-capturing device 2 will be described. The image-capturing device 2 in the present application includes at least the imaging lens (optical system) 21, which forms a subject image, and an image sensor 22, which acquires the image formed by the imaging lens 21. The image sensor 22 is not particularly limited to any sensor, and a solid-state image sensor such as a CCD sensor or a CMOS sensor can also be used. The image-capturing device 2 in the present application is suitable for image-capturing devices using these image sensors such as a digital camera and a video camera. Further, it is needless to say that the image-capturing device 2 may be a lens-fixed type image-capturing device including a lens fixed to a housing or a lens-replaceable image-capturing device such as a single lens reflex camera or a mirrorless camera.

In the image-capturing system 1 according to the present application, the imaging lens 21 and the image sensor 22 preferably satisfy conditions described below. Hereinbelow, the conditions that the imaging lens 21 and the image sensor 22 preferably satisfy will be described.

3-1. Conditional Expression (1)

The imaging lens 21 and the image sensor 22 according to the present application preferably satisfy the following Conditional Expression (1).

$$50 < f \times \tan \omega / P \qquad (1)$$

where f is the focal length of the imaging lens,

ω is the angle of view of the imaging lens, and

P is the pixel center distance between adjacent pixels of the image sensor.

The above Conditional Expression (1) is an expression that defines the ratio between the size of an image plane of the imaging lens 21 and a pixel pitch. A numerical range of Conditional Expression (1) is defined because of the following reason. When a value of f×tan ω/P of Conditional Expression (1) is larger than 50, a change in an image can be accurately extracted. The lower limit of Conditional Expression (1) is preferably 80, more preferably 120, even more preferably 200, even more preferably 400, and even more preferably 600.

Only the lower limit is defined in the above Conditional Expression (1) because it is not necessary to define the upper limit when considered from the viewpoint of those skilled in the art. However, if the upper limit is defined, the upper limit is preferably 8000, more preferably 4000, and even more preferably 2500 in view of the data amount and cost.

3-2. Conditional Expression (2)

The imaging lens 21 according to the present application preferably includes at least one lens L and satisfies the following Conditional Expression (2).

$$1.48 < NdL < 2.30 \qquad (2)$$

where

NdL is the refractive index of the lens included in the imaging lens at the d-line.

The above Conditional Expression (2) is an expression that defines the refractive index of the lens L included in the imaging lens 21. When a value of NdL in Conditional Expression (2) satisfies the above numerical range, cost of the imaging lens can be reduced. The upper limit of Conditional Expression (2) is more preferably 2.10, even more preferably 1.95, even more preferably 1.89, even more preferably 1.84, even more preferably 1.78, even more preferably 1.68, and even more preferably 1.60.

Further, the lens L included in the imaging lens 21 preferably has the lowest refractive index among lenses included in the imaging lens 21 in view of correcting the Petzval sum.

3-3. Conditional Expression (3)

All lenses included in the imaging lens 21 according to the present application preferably satisfy the following Conditional Expression (3).

$$1.48 < Nd < 2.30 \qquad (3)$$

where

Nd is the refractive index of the lens at the d-line.

The above Conditional Expression (3) is an expression that defines the refractive index of all the lenses included in the imaging lens 21. When a value of Nd in Conditional Expression (3) satisfies the above numerical range, cost of the imaging lens can be reduced. The upper limit of Conditional Expression (3) is more preferably 2.10, even more preferably 1.95, even more preferably 1.89, even more preferably 1.84, even more preferably 1.78, even more preferably 1.68, and even more preferably 1.60.

4. Process in Image-Capturing System

With the above configuration, the image-capturing control device 3 acquires image data from the image-capturing device 2, performs the extraction of difference data and the extraction of change amount data, and changes the image acquisition condition in the image-capturing device 2 as needed. Hereinbelow, the image acquisition condition change process of the image-capturing system 1 according to the present application will be described with reference to a flowchart of FIG. 6.

4-1. Image Acquisition Condition Change Process

Figure 6:
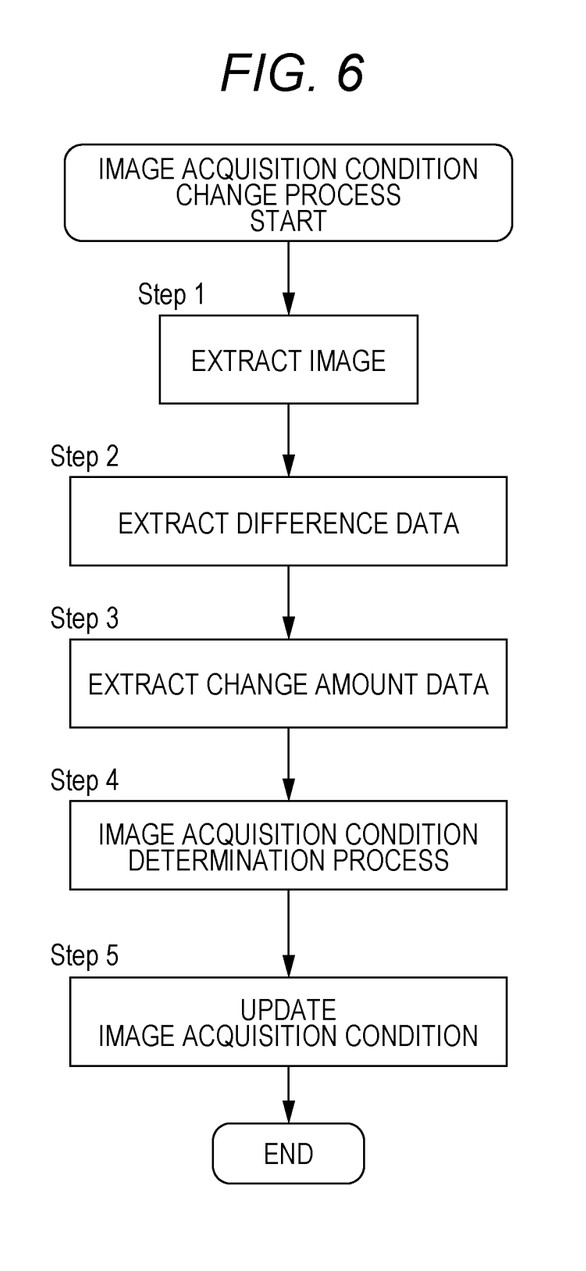
FIG. 6 is a flowchart of an image acquisition condition change process.

First, the image data acquisition unit 31 acquires image data from the image-capturing device 2, and transmits the acquired image data to the storage unit 4 as needed to store the image data in the storage unit 4. Note that, at an early stage when the image acquisition condition change process has not yet been performed, the image data is acquired on image acquisition conditions that the frame rate is 15 fps and the image size is 2 MB as an early-stage image acquisition condition in the image-capturing device 2.

Next, the difference extraction unit 32 extracts any two image data items from the storage unit 4 (Step 1), and performs a difference data extraction process (Step 2). Specifically, the difference extraction unit 32 reads two image data items acquired at different timings, specifically, the first image data and the second image data from the storage unit 4, and performs a comparison between the first image data and the second image data to extract difference data. The extracted difference data is transmitted to the condition change unit 35, and also transmitted to the storage unit 4 and stored in the storage unit 4.

Here, the second image data acquired after the first image data is preferably most recently acquired image data in order to appropriately set the next image acquisition condition. Further, the difference data is preferably stored associated with time information of the first image data and time information of the second image data, the first image data and the second image data being used in the extraction of the difference data. At this time, the difference extraction unit 32 may calculate an acquisition interval (capturing interval between the time point when the first image data is captured and the time point when the second image data is captured) from the time information of the first image data and the time information of the second image data, and store the difference data associated with the information related to the acquisition interval.

Then, the change amount extraction unit 33 extracts any two difference data items from the storage unit 4, and performs a change amount data extraction process (Step 3). Specifically, the change amount extraction unit 33 reads two different difference data items, specifically, the first difference data and the second difference data from the storage unit 4, and performs a comparison between the first difference data and the second difference data to extract change amount data. The extracted change amount data is transmitted to the condition change unit 35, and also transmitted to the storage unit 4 and stored in the storage unit 4.

Here, the difference data extracted from the storage unit 4 by the change amount extraction unit 33 is preferably difference data on which error correction has been performed by the data correction unit 34 described above because of the following reason. It is possible to eliminate information based on an error in advance and extract the change amount data with high accuracy by using the previously error-corrected data as the difference data used in the extraction of the change amount data.

Next, the condition change unit 35 executes an image acquisition determination process on the basis of the difference data input from the difference extraction unit 32 and the change amount data input from the change amount extraction unit 33 (Step 4). Note that details of the image acquisition determination process will be described below with reference to another drawing.

After determining the next image acquisition condition in the image acquisition condition determination process, the condition change unit 35 then updates the image acquisition condition stored in the storage unit 4 to the new image acquisition condition (Step 5). Then, the condition change unit 35 transmits the new image acquisition condition to the image-capturing device 2. The image-capturing device 2 acquires the next image data in accordance with the new image acquisition condition.

4-2. Image Acquisition Condition Determination Process

Figure 7:
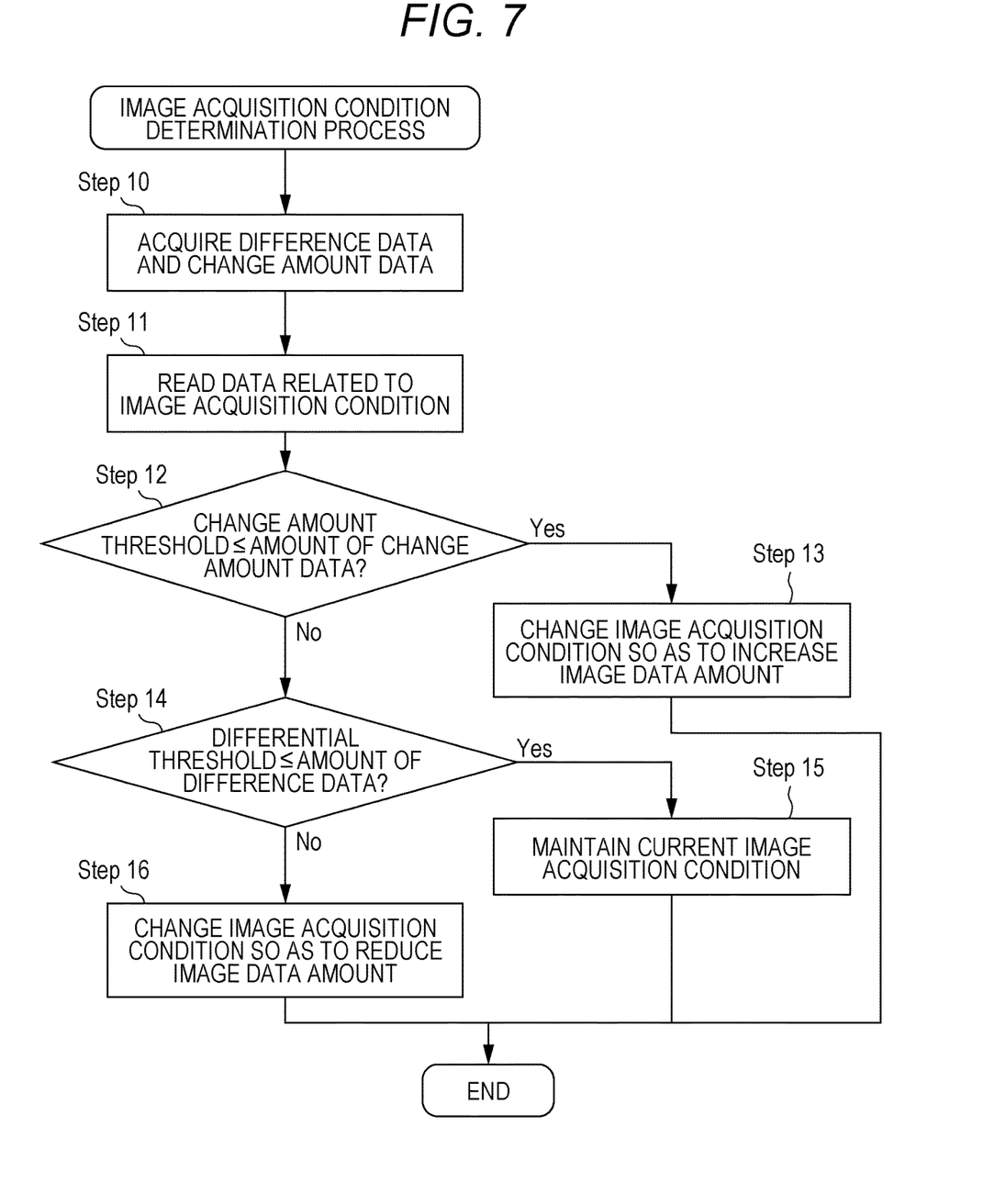
FIG. 7 is a flowchart of an image acquisition condition determination process.

Next, the image acquisition condition determination process will be described with reference to FIG. 7.

First, the condition change unit 35 acquires difference data from the difference extraction unit 32 and change amount data from the change amount extraction unit 33 (Step 10). Then, the condition change unit 35 acquires data related to the image acquisition condition from the storage unit 4 (Step 11). Concrete examples of the data related to the image acquisition condition include a change amount threshold and a difference threshold for each of the acquisition interval, the number of pixels, the resolution, the color tone (gray scale), and the size, of images. Further, the storage unit 4 stores a minimum value and/or a maximum value as setting for each image acquisition condition, and the condition change unit 35 also reads information related to the minimum value and the maximum value together with the change amount threshold and the difference threshold from the storage unit 4.

Then, the condition change unit 35 determines whether the data amount of the acquired change amount data is currently equal to or larger than the change amount threshold read from the storage unit 4 (Step 12). When the condition change unit 35 has determined that the data amount of the change amount data is equal to or larger than the change amount threshold (Yes in Step 12), the condition change unit 35 changes the next image acquisition condition so as to make the image data amount larger than the image data amount under the current image acquisition condition (Step 13). The data amount of the change amount data equal to or larger than the change amount threshold means that the number of changed pixels calculated from the two difference data items is large, that is, the change amount of the moving object present in the subject area of the image-capturing device 2 is large. Thus, in order to capture the state of the change in the moving object with higher accuracy, the condition change unit 35 changes the image acquisition condition so as to increase the image data amount. Specifically, in the case where the image acquisition condition is the image acquisition interval, the acquisition interval is shortened. In the case where the image acquisition condition is the frame rate, the frame rate is increased. Further, in the case where the image acquisition condition is the number of pixels, the resolution, the color tone, or the image size of an image to be captured, the number of pixels, the resolution, the color tone, or the image size is increased. In the present application, the image acquisition condition is not limited to one condition, and these conditions may be combined to set the image acquisition condition.

On the other hand, when the condition change unit 35 has determined that the data amount of the acquired change amount data is currently smaller than the change amount threshold read from the storage unit 4 in Step 12 (No in Step 12), the condition change unit 35 proceeds to Step 14 to determine whether the difference data is equal to or larger than the difference threshold. In the present application, based on only the data amount of the change amount data, when the data amount of the change amount data is smaller than the change amount threshold, the current image acquisition condition may be maintained, or the image acquisition condition may be changed so as to reduce the image data amount. However, in order to change the setting of the image acquisition condition with higher accuracy, in the present embodiment, the condition change unit 35 determines whether the data amount of the acquired difference data is equal to or larger than the difference threshold read from the storage unit 4 in Step 14.

The determination that the data amount of the difference data is equal to or larger than the difference threshold (Yes in Step 14) means that the number of changed pixels calculated from the two difference data items is large, that is, the change amount of the moving object present in the subject area of the image-capturing device 2 is a certain degree or more. Thus, when the condition change unit 35 has determined that the data amount of the change amount data is smaller than the change amount threshold, but the data amount of the difference data is equal to or larger than the difference threshold, the condition change unit 35 preferably maintains the current image acquisition condition without immediately changing the image acquisition condition so as to reduce the image data amount (Step 15). In this manner, the current image acquisition condition can be maintained taking into consideration not only the data amount of the change amount data, but also the determination that the data amount of the difference data is equal to or larger than the predetermined threshold. Thus, it is possible to achieve image acquisition with higher accuracy taking into consideration the state of the change in the moving object present in the subject area.

On the other hand, when the condition change unit 35 has determined that the data amount of the difference data is smaller than the difference threshold in Step 14 (No in Step 14), since not only the data amount of the change amount data, but also the data amount of the difference data is smaller than the predetermined threshold, the condition change unit 35 changes the next image acquisition condition so as to reduce the image data amount (Step 16). The data amount of the difference data smaller than the difference threshold means that the number of changed pixels calculated from the two image data items is small or almost zero, that is, the change amount of the moving object present in the subject area of the image-capturing device 2 is small or almost zero. Thus, specifically, in the case where the image acquisition condition is the acquisition interval, the condition change unit 35 extends the acquisition interval. In the case where the image acquisition condition is the frame rate, the condition change unit 35 reduces the frame rate. Further, in the case where the image acquisition condition is the number of pixels, the resolution, the color tone, or the image size of an image to be captured, the number of pixels, the resolution, the color tone, or the image size is reduced. In the present application, the image acquisition condition is not limited to one condition, and these conditions may be combined to set the image acquisition condition.

When the state in which the change amount data and the difference data are equal to or larger than the respective thresholds is continued by repeatedly executing the image acquisition condition change process described above, the condition change unit 35 preferably determines whether the changed image acquisition condition is equal to or smaller than a predetermined maximum value (the upper limit of the image data amount) stored in the storage unit 4, and sets the changed image acquisition condition to the maximum value when the changed image acquisition condition is larger than the maximum value. Accordingly, it is possible to prevent an excessive load from being applied to the image-capturing system due to the image data becoming huge more than necessary.

Further, when the state in which the change amount data and the difference data are smaller than the respective thresholds is continued, the condition change unit 35 preferably determines whether the changed image acquisition condition is equal to or larger than a predetermined minimum value (the lower limit of the image data amount) stored in the storage unit 4, and sets the changed image acquisition condition to the minimum value when the changed image acquisition condition is lower than the minimum value. Accordingly, it is possible to prevent the accuracy of the image data from being reduced more than necessary.

Next, the image-capturing device 2 in the present application will be specifically described with an example. However, the present application is not limited to the example described below. In the lens sectional view illustrated in the following example, the left side in the drawing corresponds to an object side, and the right side in the drawing corresponds to an image side.

EXAMPLES (1) Configuration of Imaging Lens

Figure 8:
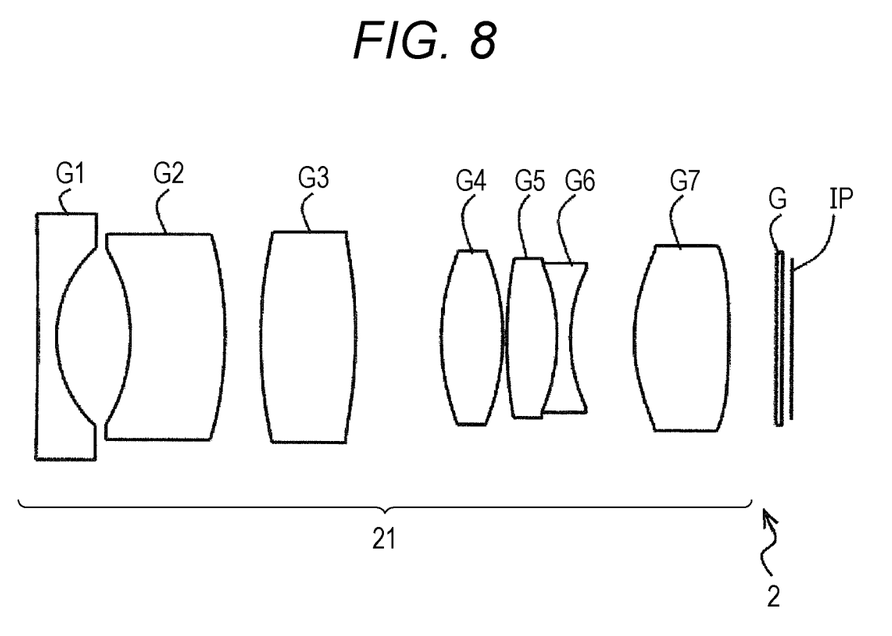
FIG. 8 is a lens sectional view of an example of an image-capturing device in the present invention.

FIG. 8 illustrates an imaging lens 21 of the example of the image-capturing device 2 in the present application. As illustrated in FIG. 8, the imaging lens 21 includes a first lens G1 which has negative refractive power and has a convex image-side surface, a second lens G2 which has negative refractive power and has a meniscus shape convex toward the image side, a third lens G3 which has positive refractive power and has a biconvex shape, a fourth lens G4 which has positive refractive power and has a biconvex shape, a fifth lens G5 which has positive refractive power and has a biconvex shape, a sixth lens G6 which has negative refractive power and has a biconcave shape, and a seventh lens G7 which has positive refractive power and has a biconvex shape, in this order from the object side. Further, the fifth lens G5 and the sixth lens G6 in this example constitute a cemented lens.

In this example, an optical block G is disposed between the seventh lens G7 and an image plane IP. The optical block G corresponds to an optical filter, a crystal low-pass filter, an infrared cut filter, or the like.

In the case where the image-capturing device 2 includes the imaging lens 21 of the example, the image plane IP corresponds to an image-capturing surface of a solid-state image sensor. A photoelectric conversion element such as the CCD sensor or the CMOS sensor described above can be used as the solid-state image sensor. In the image-capturing device 2, light incident from the object side of the imaging lens 21 of the present embodiment is finally focused on the image-capturing surface of the solid-state image sensor. Then, the solid-state image sensor photoelectrically converts the received light, and outputs the photoelectrically-converted light as an electric signal to generate a digital image corresponding to an image of the subject. The digital image is transmitted as image data to the image data acquisition unit 31 of the image-capturing control device 3.

(2) Numerical Example

Next, a numerical example to which specific numerical values of the imaging lens 21 are applied will be described. Surface data of the imaging lens will be shown below. In the surface data, "surface number" denotes the order of the lens surface from the object side, "r" denotes the curvature radius of the lens surface, "d" denotes the distance between lens surfaces on the optical axis, "nd" denotes the refractive index at the d-line (wavelength λ=587.56 nm), and "vd" denotes the Abbe number at the d-line. Further, "ASPH" next to the surface number indicates that the lens surface is an aspherical surface. Note that all lengths in the following table are in "mm". Further, "INF" in the field of the curvature radius indicates a plane.

| Surface number | r | d | nd | vd |
|---|---|---|---|---|
| 1 | −300.14 | 1.00 | 1.773 | 49.6 |
| 2 | 6.31 | 3.91 | | |
| 3 | −8.89 | 5.00 | 1.806 | 33.3 |
| 4 | −19.31 | 1.88 | | |
| 5ASPH | 24.79 | 5.00 | 1.851 | 40.1 |
| 6ASPH | −24.58 | 4.52 | | |
| 7ASPH | 10.91 | 3.25 | 1.497 | 81.6 |
| 8ASPH | −11.66 | 0.20 | | |
| 9 | 22.95 | 2.69 | 1.593 | 68.6 |
| 10 | −9.98 | 0.70 | 1.728 | 28.3 |
| 11 | 8.45 | 3.36 | | |
| 12ASPH | 9.01 | 5.00 | 1.497 | 81.6 |
| 13ASPH | −55.95 | 2.49 | | |
| 14 | INF | 0.30 | 1.517 | 64.2 |
| 15 | INF | 0.50 | | |
| Image plane | INF | | | |

Various pieces of data of the imaging lens 21 will be shown below. Specifically, the focal length (mm), the F number, the half angle of view (w/°), the image height (mm), and the lens total length (mm) of the imaging lens are shown. Here, the lens total length is the distance between the object-side surface of the first lens and the image plane.

| | |
|---|---|
| Focal length (mm) | 4.93 |
| F number (F number) | 1.59 |
| Half angle of view (°) | 60.00 |
| Image height (mm) | 4.22 |
| Lens total length (mm) | 40.79 |

An aspherical coefficient in a case where the shape of the above aspherical surface (ASPH) is defined by the following formula will be shown below. Note that the aspherical coefficient can be represented by the following aspherical formula with a displacement in the optical-axis direction at the position of the height h from the optical axis as a reference surface vertex. Further, in the following, "E-a" means "X10-a".

$$Z=ch^2/[1+\{1-(1+k)c^2h^2\}^{1/2}]+A4h^4+A6h^6+A8h^8+A10h^{10}$$

where c denotes the curvature (1/r), h denotes the height from the optical axis, k denotes the conic constant, and A4, A6, A8 and A10 are aspherical coefficients of the respective orders.

In the image-capturing device 2, the number of pixels of the used solid-state image sensor is 2 million pixels. In this case, a value of P is 0.004 mm, and a value of Conditional Expression (1) is 2135. Further, the number of pixels of the used solid-state image sensor may be 0.5 million pixels. In this case, a value of P is 0.008 mm, and a value of Conditional Expression (1) is 1068.

Figure 9:
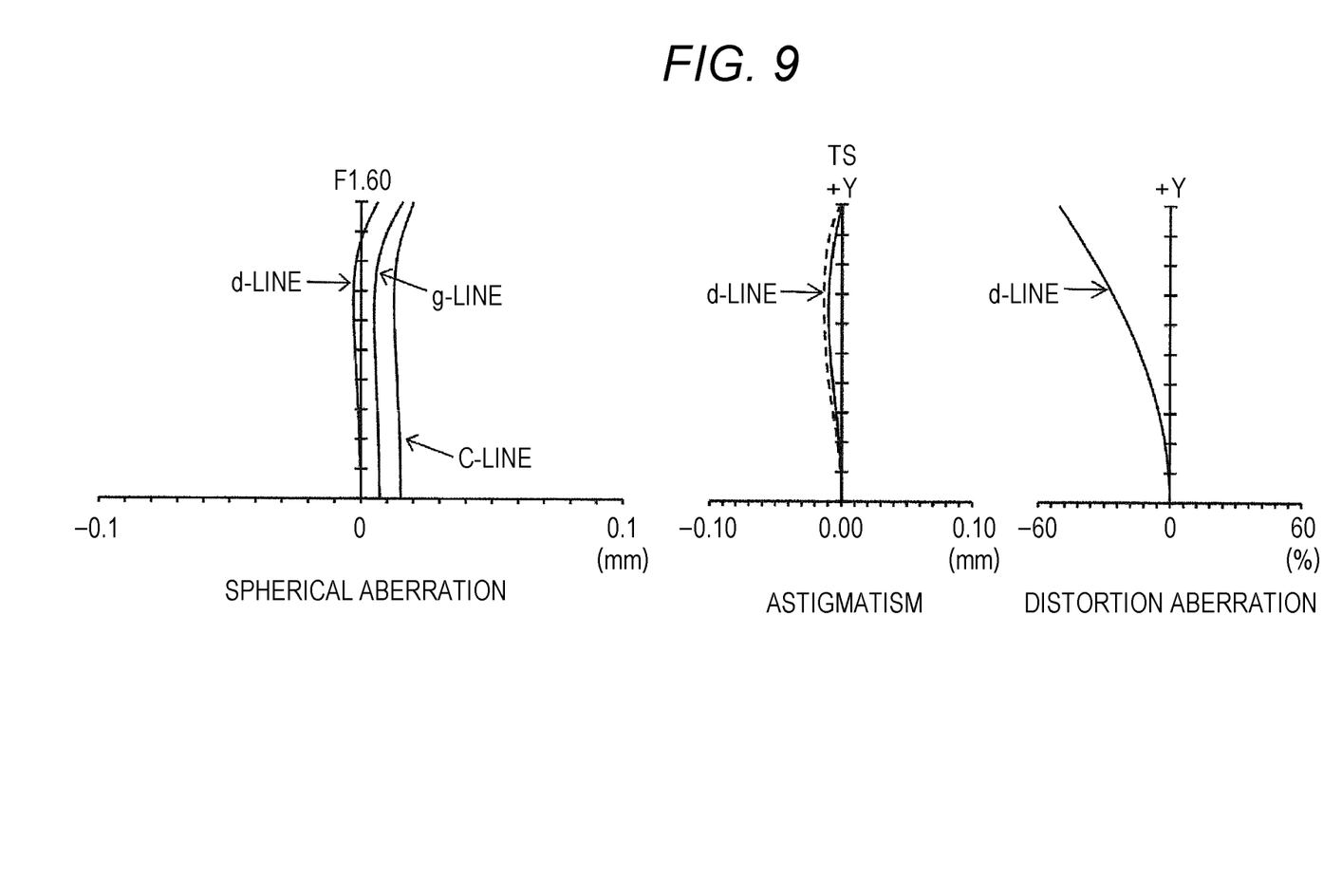
FIG. 9 is a spherical aberration diagram, an astigmatism diagram, and a distortion aberration diagram of an imaging lens of the example.

FIG. 9 is a longitudinal aberration diagram when the imaging lens 21 of the present example is focused on infinity. The longitudinal aberration diagram of FIG. 9 illustrates spherical aberration (SA/mm), astigmatism (AST/mm), and distortion aberration (DIS/%) in this order from the left in the drawing.

The vertical axis of the spherical aberration diagram represents the F number. The spherical aberration diagram illustrates spherical aberration at the d-line (wavelength: 587.56 nm), spherical aberration at the C-line (wavelength: 656.27 nm), and spherical aberration at the g-line (wavelength: 435.84 nm).

The vertical axis of the astigmatism diagram represents the image height (Y). Further, the astigmatism diagram illustrates astigmatisms of a sagittal ray S (solid line) and a meridional ray T (broken line) at the d-line (wavelength: 587.56 nm).

The vertical axis of the distortion aberration diagram represents the image height (Y). Further, distortion aberration (distortion) at the d-line (wavelength: 587.56 nm) is indicated by a solid line.

INDUSTRIAL APPLICABILITY

The image-capturing system according to the present invention is capable of acquiring an image that enables high analysis accuracy to be maintained while reducing the amount of data related to the acquisition of the image. Thus, observation with higher accuracy can be performed by employing the image-capturing system, for example, in a fixed-point camera or a surveillance camera. In addition to the above, an analysis related to a moving object can be performed with high accuracy on the basis of the difference data and the change amount data. Thus, highly sophisticated estimation of the moving speed and the moving locus of the moving object can be performed by employing the image-capturing system, for example, in an onboard camera. Thus, it is possible to improve the possibility of risk prevention.

REFERENCE SIGNS LIST

1 image-capturing system
2 image-capturing device

| Surface number | (1 + k) | A4 | A6 | A8 | A10 |
|---|---|---|---|---|---|
| 5 | 1.000 | −4.731E−05 | 5.182E−07 | 1.476E−08 | 3.046E−11 |
| 6 | 1.000 | 1.980E−05 | 1.778E−06 | 1.047E−09 | 4.342E−10 |
| 7 | 1.000 | −2.665E−04 | 3.086E−07 | −5.887E−09 | −1.470E−10 |
| 8 | 1.000 | 7.763E−05 | 6.302E−07 | −1.375E−08 | −4.614E−12 |
| 12 | 1.000 | −3.050E−04 | −4.460E−06 | 7.105E−08 | −7.762E−09 |
| 13 | 1.000 | −5.956E−04 | −3.872E−06 | −2.607E−08 | −1.873E−09 |

3 image-capturing control device
4 storage unit
21 imaging lens
22 image sensor
31 image data acquisition unit (image data acquisition means)
32 difference extraction unit (difference extraction means)
33 change amount extraction unit (change amount extraction means)
34 data correction unit (data correction means)
35 condition change unit (condition change means)
36 image-capturing control unit (image-capturing control means)

The invention claimed is:

1. An image-capturing system comprising:
an image-capturing device configured to acquire image data of a subject; and
an image-capturing control device configured to control image acquisition by the image-capturing device, the image-capturing control device including
a difference extraction unit configured to extract difference data on the basis of any two image data items acquired by the image-capturing device,
a change amount extraction unit configured to extract change amount data on the basis of any two difference data items extracted by the difference extraction unit, and
a condition change unit configured to change an image acquisition condition in the image-capturing device on the basis of the change amount data extracted by the change amount extraction unit,
wherein the difference extraction unit, the change amount extraction unit, and the condition change unit are each implemented via at least one processor.

2. The image-capturing system according to claim 1, wherein the image acquisition condition is at least one of an acquisition interval, a number of pixels, a resolution, a color tone, or a size, of images.

3. The image-capturing system according to claim 1, wherein when an amount of the change amount data is equal to or larger than a predetermined change amount threshold, the condition change unit is further configured to change the image acquisition condition so as to make an image data amount larger than an image data amount under a current image acquisition condition.

4. The image-capturing system according to claim 1, wherein when an amount of the change amount data is smaller than a predetermined change amount threshold, the condition change unit is further configured to maintain the image acquisition condition or change the image acquisition condition so as to make an image data amount smaller than an image data amount under a current image acquisition condition.

5. The image-capturing system according to claim 4, wherein when an amount of a newest one of the two difference data items is equal to or larger than a predetermined difference threshold, the condition change unit is further configured to maintain the current image acquisition condition.

6. The image-capturing system according to claim 4, wherein when an amount of a newest one of the two difference data items is smaller than a predetermined difference threshold, the condition change unit is further configured to change the image acquisition condition so as to make an image data amount smaller than an image data amount under the current image acquisition condition.

7. The image-capturing system according to claim 1, wherein the condition change unit is further configured to set a minimum value and/or a maximum value of the image acquisition condition.

8. The image-capturing system according to claim 1, wherein the difference extraction unit is further configured to extract the difference data on the basis of at least either the number of pixels or a ratio of pixels different between the two image data items.

9. The image-capturing system according to claim 1, wherein the change amount extraction unit is further configured to extract the change amount data on the basis of at least either the number of pixels or a ratio of pixels different between the two difference data items.

10. The image-capturing system according to claim 1, wherein
the image acquisition condition is an image acquisition interval, and
the difference extraction unit is further configured to calculate the image acquisition interval on the basis of an acquisition interval between the two image data items.

11. The image-capturing system according to claim 1, wherein the difference extraction unit is further configured to divide a whole of each of the two image data items into a plurality of local blocks, and extract local difference data for each of the local blocks to extract the difference data.

12. The image-capturing system according to claim 11, wherein the change amount extraction unit is further configured to extract the change amount data on the basis of the local difference data.

13. The image-capturing system according to claim 1, further comprising a data correction unit configured to adjust error data included in the difference data and/or the change amount data,
wherein the data correction unit is implemented via at least one processor.

14. The image-capturing system according to claim 13, wherein the data correction unit is further configured to divide a whole of each image data acquired in the image-capturing device into a plurality of local blocks, and adjust the error data for each of the local blocks.

15. The image-capturing system according to claim 13, wherein
the image-capturing device includes an imaging lens configured to form a subject image, and an image sensor configured to acquire the subject image formed by the imaging lens, and
the data correction unit is further configured to adjust error data caused by distortion dependent on an angle of view of the imaging lens.

16. The image-capturing system according to claim 1, wherein
the image-capturing device includes an imaging lens configured to form a subject image, and an image sensor configured to acquire the subject image formed by the imaging lens, and satisfies the following condition (1), $$50 < f \times \tan \omega / P \quad (1)$$

where
f is a focal length of the imaging lens,
$\omega$ is an angle of view of the imaging lens, and
P is a pixel center distance between adjacent pixels of the image sensor.

17. The image-capturing system according to claim 1, wherein the image-capturing device is fixed at a fixed point.

* * * * *